3,528,981
PERIMIDINE DERIVATIVES
Theodore S. Sulkowski, Narberth, and Myles A. Wille, Philadelphia, Pa., assignors to American Home Products Corporation, New York, N.Y., a corporation of Delaware
No Drawing. Continuation-in-part of application Ser. No. 466,824, June 24, 1965. This application May 2, 1967, Ser. No. 635,386
Int. Cl. C07d 51/48
U.S. Cl. 260—256.4                    16 Claims

ABSTRACT OF THE DISCLOSURE

The compounds of the class of 10H-pyrrolo[1,2-a]perimidin-10-ones and 12H - isoindolo[2,1 - a]perimidin-12-ones and their derivatives useful as anti-inflammatory, central nervous system depressant and anti-Parkinson agents.

CROSS-REFERENCES TO RELATED APPLICATION

This application is a continuation-in-part of co-pending application Ser. No. 466,824 filed June 24, 1965, and now abandoned.

BACKGROUND OF THE INVENTION

This invention relates to the field of new physiologically active 10H-pyrrolo[1,2-a]perimidin-10-ones, 12H-isoindolo[2,1 - a]perimidin - 12 - ones, their derivatives, novel process for their preparation and new intermediates useful in the preparation thereof.

SUMMARY OF THE INVENTION

More particularly, this invention is directed to compounds of the formulae

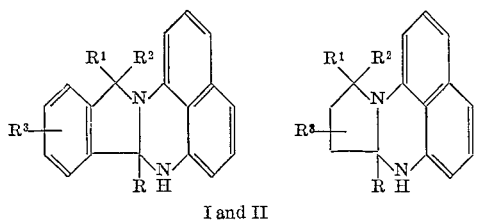

I and II wherein R is selected from the group consisting of alkyl of less than 5 carbon atoms, phenyl, halophenyl, alkoxyphenyl and thienyl; $R^1$ and $R^2$ are hydrogen, or together $R^1$ and $R^2$ is oxo (=O); and $R^3$ is selected from the group consisting of hydrogen, halogen, lower alkyl, lower alkoxy, phenyl, nitro and amino.

The terms "lower alkyl" and "lower alkoxy" are meant to relate to those groups having less than 8 carbon atoms.

The substituents on the phenyl group may be in the o, m, or p-positions.

The novel compounds of this invention are physiologically active substances which possess anti-inflammatory, anti-Parkinson, and central nervous system depressant activity.

The compounds of the present invention can be prepared and administered to warm-blooded animals in a wide variety of oral and parenteral dosage forms.

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents; it can also be an encapsuplating material. In powders the carrier is a finely divided solid which is in admixture with the finely divided compound. In the tablet the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably, the pharmaceutical preparatiton is in unit dosage form. In such form, the preparation is sub-divided in unit doses containing appropriate quantities of the compound, the unit dosage form can be a packaged preparation, the package containing discrete quantities of preparation, for example, packeted powders, vials or ampules.

The unit dosage form can be a capsule, cachet or tablet itself or it can be the appropriate number of any of those in packaged form. The quantity of compound in a unit dose of preparation may be varied or adjusted from 1 mg. to 100 mg. according to the particular application and the potency of the active ingredient.

In therapeutic use, the preparations are administered at the initial dosage of about 5 mg. to 25 mg. per kilogram daily. The dosages, however, may be varied depending upon the requirements of the patient.

The compounds of this invention may be prepared by employing the novel processes of this invention which may be represented by the following reaction scheme wherein R and $R^3$ are as hereinbefore defined, and $R^4$ is hydrogen or lower alkyl:

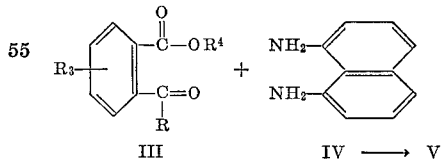

III                    IV ⟶ V

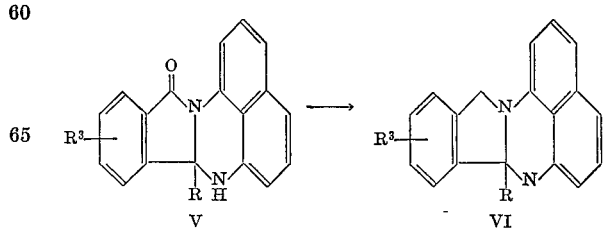

V                    VI

In accordance with one feature of this invention, the 1,8-diaminonaphthalene compounds of Formula IV are condensed with the o-acyl benzoic acid compound of Formula III by heating at elevated temperatures in an inert organic solvent to yield the 12H-isoindolo[2,1-a]perimidin-12-one compounds of Formula V, which are physiologically active compounds of this invention.

The condensation reaction is preferably conducted by refluxing approximately stoichiometric amounts of the reactants in a solvent such as toluene and continuously removing the water of the reaction as it forms. Generally the reaction takes from 14 to 20 hours.

In accordance with another feature of this invention, the keto group of the 12H-isoindolo[2,1-a]perimidin-12-one compounds of Formula V may be reduced with a reducing agent such as lithium aluminum hydride to form the 12H-isoindolo-[2,1-a]perimidines of Formula VI which are additional final products of this invention.

Similarly, the 1,8-diaminonaphthalene compounds of Formula IV may be condensed with the propionic acid derivatives of the formula:

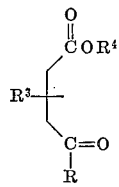

VII wherein R, $R^3$ and $R^4$ are as hereinbefore defined, to yield the pharmaceutically active 10H-pyrrolo[1,2-a]perimidin-10-one compounds of the formula:

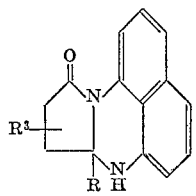

VIII wherein R and $R^3$ are as hereinbefore defined.

Also the compounds of Formula VIII may be reduced with a reducing agent such as lithium aluminum hydride to yield the 10H-pyrrolo[1,2-a]permidine compounds of the formula:

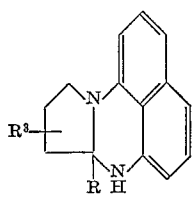

IX wherein R and $R^3$ are as hereinbefore defined.

The following examples illustrate the invention (all temperatures being in centigrade):

EXAMPLE 1

7a-(p-chlorophenyl)-7,7a-dihydro-12H-isoindolo[2,1-a]perimidin-12-one

Thirteen grams of o-(p-chlorobenzoyl)benzoic acid, 8 g. of 1,8-diaminonaphthalene and 100 ml. of toluene are refluxed for 14 hours in a flask equipped with a water separator. The solution is filtered while hot and cooled to room temperature. The precipitated solid is separated by filtration and washed with alcohol. On recrystallization from dimethyl formamide there is obtained 7a-(p-chlorophenyl) - 7,7 - dihydro - 12H - isoindolo[2,1 - a] perimidin-12-one, M.P. 273–5° C.

EXAMPLE 2

7,7a-dihydro-7a-phenyl-12H-isoindolo[2,1-a]perimidin-12-one 22 gms. of o-benzoylbenzoic acid, 16 g. of 1,8-diaminonaphthalene and 200 ml. of toluene were refluxed 14 hours in a flask equipped with a water separator. The solution is filtered and allowed to cool to room temperature. The solid is separated by filtration and washed with alcohol. On recrystallization from aqueous dimethyl formamide there is obtained 7,7a-dihydro-7a-phenyl-12H-isoindolo[2,1-a]perimidin-12-one, M.P. 258–260° C.

EXAMPLE 3

7a-(3-amino-4-chlorophenyl)-7,7a-dihydro-12H-isoindolo[2,1-a]perimidin-12-one 27 gms. of 3-amino-2′-carboxy-4-chlorobenzophenone, 19 g. of 1,8-diaminonaphthalene and 300 ml. of toluene were refluxed 16 hours in a flask equipped with a water separator. The solution is cooled, extracted with saturated sodium carbonate solution and evaporated to dryness. On recrystallization from ethyl acetate there is obtained 7a-(3 - amino - 4 - chlorophenyl) - 7,7a - dihydro - 12H-isoindolo[2,1-a]perimidin-12-one, M.P. 255–7° C.

EXAMPLE 4

7,7a-dihydro-7a-methyl-12H-isoindolo[2,1-a]perimidin-12-one

Eight grams of 2-acetylbenzoic acid, 8 g. of 1,8-diaminonaphthalene, and 100 ml. of toluene are refluxed 16 hours in a flask equipped with a water separator. The reaction mixture is evaporated to a solid residue. On recrystallization from ethyl acetate there is obtained 7,7a-dihydro - 7a - methyl - 12H - isoindolo[2,1 - a]perimidin-12-one, M.P. 244–6° C.

EXAMPLE 5

7,7a-dihydro-7a-methyl-12H-isoindolo[2,1-a]perimidine, ethanolate 12 gms. of 7,7a-dihydro-7a-methyl-12H-isoindolo[2,1-a]perimidin-12-one is added to a stirred suspension of 4 grams of lithium aluminum hydride in 250 ml. of ether. After refluxing 20 hours, the excess hydride is decomposed with water. The ether layer is separated, dried over magnesium sulfate and evaporated in vacuo. The gummy residue is dissolved in 50 ml. of abs. ethanol with warming and allowed to cool to room temperature. The precipitated solid is separated and washed with cold ethanol. On recrystallization from ethanol there is obtained 7,7a-dihydro - 7a - methyl - 12H - isoindolo[2,1 - a]perimidine, ethanolate, M.P. 127–8° C.

EXAMPLE 6

7,7a,8,9-tetrahydro-7a-(p-methoxyphenyl)-10H-pyrrolo-[1,2-a]perimidin-10-one 11 gms. of 3-(p-methoxybenzoyl)propionic acid, 9 g. of 1,8-diaminonaphthalene, and 100 ml. of toluene are refluxed 18 hours in a flask equipped with a water separator. The solution is filtered while hot and cooled to room temperature. The precipitated solid is separated by filtration. On recrystallization from ethanol there is obtained 7,7a,8,9-tetrahydro - 7a - (p-methoxyphenyl)-10H-pyrrolo-[1,2-a]perimidin-10-one, M.P. 207–9° C.

EXAMPLE 7

7a-(p-chlorophenyl)-7,7a,8,9-tetrahydro-10H-pyrrolo[1,2-a]perimidin-10-one

Following the procedure of Example 6, but substituting 3-(p-chlorobenzoyl)-propionic acid for 3-(p-methoxybenzoyl)propionic acid there is obtained 7a-(p-chlorophenyl) - 7,7a,8,9 - tetrahydro - 10H - pyrrolo[1,2-a] perimidin-10-one, M.P. 240–2° C.

EXAMPLE 8

7,7a,8,9-tetrahydro-7a-methyl-9-phenyl-10H-pyrrolo[1,2-a]perimidin-10-one

Following the procedure of Example 6, but substituting α-phenyllevulinic acid for 3-(methoxybenzoyl)propionic acid there is obtained 7,7a,8,9-tetrahydro - 7a - methyl-9- phenyl-10H-pyrrolo[1,2 - a]perimidin-10-one, M.P. 210–212° C.

EXAMPLE 9

7,7a,8,9-tetrahydro-7a-(2-thienyl)-10H-pyrrolo
[1,2-a]perimidin-10-one

Following the procedure of Example 6, but substituting 3-(α-thenoyl) propionic acid for 3-(methoxybenzoyl)propionic acid where is obtained 7,7a,8,9-tetrahydro-7a-(2-thienyl)-10H-pyrrolo[1,2-a]perimidin-10-one, M.P. 263–5° C.

EXAMPLE 10

7,7a,8,9-tetrahydro-7a-methyl-10H-pyrrolo[1,2-a]
perimidin-10-one

Following the procedure of Example 6, but substituting levulinic acid for 3-(methoxybenzoyl)propionic acid there is obtained 7,7a,8,9-tetrahydro-7a-methyl-10H - pyrrolo [1,2-a]perimidin-10-one, M.P. 142–4° C.

EXAMPLE 11

7a,8,9,10-tetrahydro-7a-(p-methoxyphenyl)-pyrrolo
[1,2-a]perimidine 24 grams of 7,7a,8,9-tetrahydro-7a-(p-methoxyphenyl)-10H-pyrrolo[1,2-a]perimidin-10-one are added in portions to a stirred suspension of 9 g. of lithium aluminum hydride in one liter of anhydrous ether. After refluxing 16 hours, the excess hydride is decomposed with water. The ether layer is separated, dried over magnesium sulfate then evaporated to a solid residue. On recrystallization from ethanol there is obtained 7a,8,9,10 - tetrahydro-7a-(p-methoxyphenyl) - pyrrolo[1,2-a] perimidine, M.P. 144–6° C.

Various changes and modifications of this invention can be made by those skilled in the art to which it relates.

What is claimed is:

1. A compound selected from the group consisting of those of the formulae:

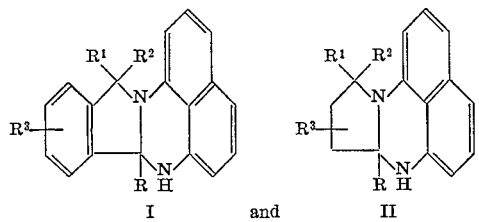

wherein R is selected from the group consisting of alkyl of less than 5 carbon atoms, phenyl, halophenyl, lower alkoxyphenyl and thienyl, $R^1$ and $R^2$ are hydrogen, or together $R^1$ and $R^2$ is oxo (=O), and $R^3$ is selected from the group consisting of hydrogen, halogen, lower alkyl, lower alkoxy, phenyl, nitro and amino.

2. A compound according to claim 1 having the structural formula

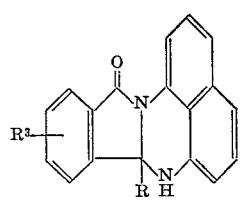

wherein R and $R^3$ are as hereinbefore defined.

3. A compound according to claim 2 that is 7a-(p-chlorophenyl)7,7a - dihydro - 12H-isoindolo[2,1-a]perimidin-12-one.

4. A compound according to claim 2 that is 7,7a-dihydro-7a-phenyl-12H-isoindolo[2,1-a]perimidin-12-one.

5. A compound according to claim 2 that is 7a-(3-amino - 4 - chlorophenyl) - 7,7a-dihydro-12H-isoindolo [2,1-a]perimidin-12-one.

6. A compound according to claim 2 that is 7,7a-dihydro-7a-methyl - 12H - isoindolo[2,1-a]perimidin-12-one.

7. A compound according to claim 1 having the structural formula

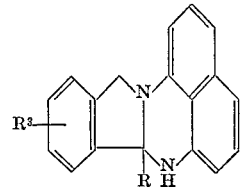

wherein R and $R^3$ are as hereinbefore defined.

8. A compound according to claim 7 that is 7,7a-dihydro-7a-methyl - 12H - isoindolo[2,1-a]perimidine, ethanolate.

9. A compound according to claim 1 having the structural formula

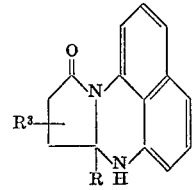

wherein R and $R^3$ are as hereinbefore defined.

10. A compound according to claim 9 that is 7,7a,8,9-tetrahydro - 7a - (p - methoxyphenyl-10H-pyrrolo[1,2-a] perimidin-10-one.

11. A compound according to claim 9 that is 7a-(p-chlorophenyl) - 7,7a,8,9 - tetrahydro-10H-pyrrolo[1,2-a] perimidin-10-one.

12. A compound according to claim 9 that is 7,7a,8,9-tetrahydro - 7a - methyl-9-phenyl-10H - pyrrolo[1,2-a] perimidin-10-one.

13. A compound according to claim 9 that is 7,7a,8,9-tetrahydro-7a-(2 - thienyl) - 10H - pyrrolo[1,2-a]perimidin-10-one.

14. A compound according to claim 9 that is 7,7a,8,9-tetrahydro-7a-methyl - 10H - pyrrolo[1,2-a]perimidin-10-one.

15. A compound according to claim 1 having the structural formula

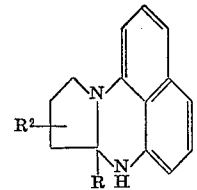

wherein R and $R^3$ are as hereinbefore defined.

16. A compound according to claim 15 that is 7a,8,9, 10 - tetrahydro - 7a - (p - methoxyphenyl)pyrrolo[1,2-a] perimidine.

References Cited

Chem. Abstracts, 64:6664–5 (1966).

ALEX MAZEL, Primary Examiner

R. J. GALLAGHER, Assistant Examiner

U.S. Cl. X.R.

260—251, 470, 471, 473, 476, 481, 482, 483, 515, 516, 517, 518, 519, 521, 526, 534, 535, 539; 424—251